United States Patent [19]

Halasa et al.

[11] Patent Number: 4,843,120
[45] Date of Patent: Jun. 27, 1989

[54] RUBBER COMPOSITION

[75] Inventors: Adel F. Halasa, Bath; Bill B. Gross, Stow; Joel L. Cox; George F. Balogh, both of North Canton, all of Ohio

[73] Assignee: The Goodyear Tire & Rubber Company, Akron, Ohio

[21] Appl. No.: 912,489

[22] Filed: Sep. 29, 1986

[51] Int. Cl.$^4$ .................... C08F 36/04; C08L 9/06; B60C 5/00

[52] U.S. Cl. ................................ 525/53; 525/232; 525/237; 525/313; 525/314; 525/914; 526/65; 526/73; 526/173; 526/178; 526/179; 526/335; 526/337; 526/340; 428/492; 428/521; 152/450

[58] Field of Search ............ 526/178, 179, 335, 337, 526/340, 65, 73, 173; 525/53, 232, 914, 237, 313, 314; 152/525, 450; 428/492, 521

[56] References Cited

U.S. PATENT DOCUMENTS

| | | | |
|---|---|---|---|
| 3,301,840 | 1/1967 | Zelinski | 526/180 X |
| 3,624,057 | 11/1971 | Farrar | 526/178 |
| 3,629,213 | 12/1971 | Onishi | 526/340 |
| 3,631,015 | 12/1971 | Trepka | 526/179 |
| 4,022,959 | 5/1977 | Sommer et al. | 526/180 |
| 4,048,427 | 9/1977 | Hargis | 526/337 |
| 4,111,867 | 9/1978 | Komuro | 526/340 |
| 4,334,567 | 6/1982 | Bond | 526/340 |
| 4,385,151 | 5/1983 | Furukawa | 526/337 |
| 4,436,873 | 3/1984 | Furukawa et al. | 526/335 X |
| 4,525,560 | 6/1985 | Smith | 526/340 |

OTHER PUBLICATIONS

Multiple Glass Transitions of Block Polymers, Angelo et al., Polymer 6(3), 141–56 (1965).

*Primary Examiner*—Joseph L. Schofer
*Assistant Examiner*—F. M. Teskin
*Attorney, Agent, or Firm*—Alvin T. Rockhill

[57] ABSTRACT

It has been determined that certain rubbery polymers having multiple glass transition temperatures can be utilized in making tires which have improved rolling resistance, improved wet skid resistance, and outstanding tread wear. These rubbery polymers are derived from at least one conjugated diolefin monomer, have a first glass transition temperature which is between −110° C. and −20° C. and have a second glass transition temperature which is between −50° C. and 0° C. These rubber polymers can be homopolymers of conjugated diolefin monomers, copolymers of more than one conjugated diolefin monomer, or copolymers derived from at least one conjugated diolefin monomer and at least one vinyl aromatic monomer.

27 Claims, No Drawings

RUBBER COMPOSITION

BACKGROUND OF THE INVENTION

It is highly desirable for tires to have good wet skid resistance, low rolling resistance, and good wear characteristics. It has traditionally been very difficult to improve a tires rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tires tread. On the other hand, in order to increase the wet skid resistance of a tire, rubbers which undergo a large energy loss have generally been utilized in the tires tread. In order to balance these two viscoelastically inconsistent properties mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

SUMMARY OF THE INVENTION

It has been unexpectedly found that certain rubbery polymers which exhibit multiple glass transition temperatures have excellent properties for incorporation into tire treads. These rubbers exhibit a first glass transition temperature which is between $-110°$ C. and $-20°$ C. and a second glass transition temperature which is between $-50°$ C. and $0°$ C. A third glass transition temperature which is between $-20°$ C. and $20°$ C. can also commonly be detected in these rubbers. Such rubbers are derived from at least one conjugated diolefin monomer and also commonly contain one or more vinyl aromatic monomers. For instance, these rubbers can be polybutadiene, polypiperylene, polyisoprene, polydimethylbutadiene, butadiene-styrene rubbers, butadiene-isoprene copolymers, and the like.

The rubbers of this invention are "tailor-made" in a manner which provides a microstructure that results in the requisite multiple glass transition temperatures. The microstructure of these rubbery polymers varies from one end of their polymer chains to the other. In other words, their polymer chains contain polymeric segments which have different microstructures. For instance, the repeat units at one end of the polymer chain can have a microstructure wherein there are predominantly 1,2-linkages with the repeat units at the other (opposite) end of the polymer chain having a microstructure wherein there are predominantly 3,4-linkages. It is also suitable for such rubbery polymers to have repeat units at one end of their polymer chains which have a microstructure wherein there are predominantly 1,4-linkages with the repeat units at the other end of their polymer chains having a microstructure wherein there are predominantly 3,4-linkages. It is further suitable for such rubbery copolymers to have repeat units at one end of their polymer chains which have a microstructure wherein there are predominately 1,2-linkages with the repeat units at the other end of their polymer chains having a microstructure wherein there are predominantly 1,4-linkages.

The present invention more specifically relates to a rubbery polymer which has an excellent combination of properties for use in making tire treads which is comprised of repeat units which are derived from at least one conjugated diolefin monomer, wherein the rubbery polymer has a first glass transition temperature which is between $-110°$ C. and $-20°$ C. and a second glass transition temperature which is between $-50°$ C. and $0°$ C. Typically such rubbery copolymers will also exhibit an additional glass transition temperature which is between $-20°$ C. and $20°$ C.

The present invention also relates to a process for preparing a rubbery polymer which has an excellent combination of properties for use in making tire treads which comprises polymerizing at least one conjugated diolefin monomer in a first reaction zone at a temperature and under conditions sufficient to produce a first polymeric segment having a glass transition temperature which is between $-110°$ C. and $-20°$ C. and subsequently continuing said polymerization in a second reaction zone at a temperature and under conditions sufficient to produce a second polymeric segment having a glass transition temperature which is between $-20°$ C. and $20°$ C. Such polymerizations are normally catalyzed with an organolithium catalyst and are normally carried out in an inert organic solvent.

DETAILED DESCRIPTION OF THE INVENTION

The rubbery polymers of the present invention are comprised of repeat units which are derived from at least one conjugated diolefin monomer. These rubbery polymers can optionally contain repeat units which are derived from one or more vinyl aromatic monomers. Accordingly, the rubbery polymers of the present invention are prepared by polymerizing at least one conjugated diolefin monomer or by copolymerizing one or more conjugated diolefin monomers with one or more vinyl aromatic monomers.

The conjugated diolefins which can be polymerized in accordance with the present invention generally have the structural formula:

wherein R is a hydrogen atom or an alkyl group containing from 1 to 8 carbon atoms, and wherein $Y^1$ and $Y^2$ can be the same or different and are selected from the group consisting of hydrogen atoms and alkyl groups containing from 1 to 4 carbon atoms. Some representative examples of suitable conjugated diolefins include 1,3-butadiene, isoprene, 2-ethyl butadiene piperylene (1,3-pentadiene), 2-methyl-1,3-pentadiene, 4-butyl-1,3-pentadiene, 2,3-dimethyl-1,3-pentadiene, 1,3-hexadiene, 1,3-octadiene, 2,3-dibutyl-1,3-pentadiene, 2-ethyl-1,3-pentadiene, 2-ethyl-1,3-butadiene, and the like. Conjugated diolefin monomers containing from 4 to 8 carbon atoms are normally preferred for commercial purposes. For similar reasons, 1,3-butadiene and isoprene are the most commonly utilized conjugated diolefin monomers.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with conjugated diolefin monomers in the polymerization feed include propane, propylene, isobutane, normal-butane, 1-butene, isobutylene, trans-2-butene, cis-2-butene, vinyl acetylene, cyclohexane, ethylene, propylene, and the like.

The vinyl aromatic monomers which can optionally be used will be selected so as to be copolymerizable with the conjugated diolefin monomers being employed. Generally, any vinyl aromatic monomer which is known to polymerize with organo lithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized in the rubbery polymers of the present invention include 1-vinylnapthalene, 2-vinylnapthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diolefin monomers and vinyl aromatic monomers employed in the rubbery polymers of the present invention can vary over a wide range. In preparing such rubbery polymers, the ratio of the conjugated diolefin monomers to vinyl aromatic monomers should be sufficient so as to produce a substantially rubbery or elastomeric copolymer product. There is no sharp break point as to the amount of conjugated diolefin monomer to vinyl aromatic monomer that confers rubbery or elastomeric properties in the resulting copolymer. However, in general at least about 50 mole percent conjugated diolefin monomers are required on an exemplary basis in order to produce a rubbery copolymer. Thus, for a rubbery copolymer the mole ratio of conjugated diolefin monomers to vinyl aromatic monomers in the monomer charge will be in the range of about 50:50 to 99:1. More typically the mole ratio of conjugated diolefin monomers to vinyl aromatic monomers will be in the range of 65:35 to 95:5. Mixtures of various conjugated diolefin monomers as well as mixtures of vinyl aromatic monomers can be utilized.

The initiators used in synthesizing the rubbery polymers of the present invention are organolithium compounds. These organolithium initiators can be of the multifunctional or monofunctional type. The multifunctional organolithium initiators can be either specific organolithium compounds, or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. With regard to the feedstock employed as the source of conjugated diene, the multifunctional initiator types, for example, generally are preferred when a low concentration diene stream is at least a portion of the feedstock, since some components present in the unpurified low concentration diene stream may tend to react with carbon-lithium bonds to deactivate initiator activity, thus necessitating the presence of sufficient lithium functionality in the initiator so as to override such effects.

Among the multifunctional initiators, which may not necessarily be specific compounds, are those prepared by reacting an organomonolithium compound with a multivinylphosphine or with a multivinylsilane in a diluent such as a hydrocarbon or a mixture of a hydrocarbon and a polar organic compound. The reaction between the multivinylsilane or multivinylphosphine and the organomonolithium compound can result in a precipitate, which can be solubilized if desired, by adding a solubilizing monomer such as a conjugated diene or monovinylaromatic compound after reaction of the primary components. Alternatively the reaction can be conducted in the presence of a minor amount of the solubilizing monomer. Relative amounts of organomonolithium compound and multivinylsilane or multivinylphosphine preferably should be in the range of about 0.33 to 4 moles of organomonolithium compound per mole of vinyl group present in the multivinylsilane or multivinylphosphine employed.

Exemplary organomonofunctional lithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl)(3-n-butylphenyl)divinylsilane, and the like.

Exemplary multivinylphosphine compounds include trivinylphosphine, methyl divinylphosphine, dodecyl divinylphosphine, phenyl divinylphosphine, cyclooctyl divinylphosphine and the like.

Other multifunctional polymerization initiators can be prepared by utilizing an organomonolithium compound, such as described above, further together with a multivinylaromatic compound and either a conjugated diene or monovinylaromatic compound or both. These ingredients can be contacted together in a hydrocarbon or a mixture of a hydrocarbon and a polar organic compound as diluent. Alternatively, a multifunctional polymerization initiator can be prepared in a two step process by reacting an organomonolithium compound with a conjugated diene or monovinylaromatic compound and then adding the multivinylaromatic compound. The ratio of conjugated diene or monovinylaromatic compound additive employed should be in the range of about 2 to 15 moles of polymerizable compound per mole of organolithium compound. The amount of multivinylaromatic compound employed should be in the range of about 0.05 to 2 moles per mole of organomonolithium compound.

Exemplary multivinylaromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinylaromatic hydrocarbon containing up to 18 carbon atoms per molecule are preferred particularly divinylbenzene as either the ortho, meta, or para isomer, and commercial divinylbenzene, which can be a mixture of isomers, also is quite satisfactory.

Other types of multifunctional initiators can be employed, such as those prepared by contacting a sec- or tert-organomonolithium compound with 1,3-butadiene, in a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed, if desired.

Alternatively, specific organolithium compounds can be employed, if desired, as initiators in the preparation of the polymers in accordance with our invention of preparing easily processable polymers. These can be represented by $R(Li)_x$ wherein R represents a hydrocarbyl radical of such as 1 to 20 carbon atoms per R group, and x is an integer of 1 to 4.

Exemplary organolithium compounds are methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dithiobiphenyl, and the like.

The rubbery polymers of the present invention are tailor-made so as to have multiple glass transition temperatures which are within very specific required temperature ranges. These rubbery polymers exhibit a first glass transition temperature which is between $-110°$ C. and $-20°$ C. They also exhibit a second glass transition temperature which is between $-50°$ C. and $0°$ C. In most cases it will be possible to detect a third glass transition temperature in such rubbery polymers which is between $-20°$ C. and $20°$ C. It is generally preferred for the rubbery polymers of this invention to have a first glass transition temperature within the range of $-100°$ C. to $-65°$ C. and a second glass transition temperature within the range of $-35°$ C. to $-10°$ C. It is most preferred for such polymers to have a first glass transition temperature within the range of $-90°$ C. to $-70°$ C. and a second glass transition temperature within the range of $-20°$ C. to $-10°$ C.

The multiple glass transition temperatures in these polymers is attributable to polymeric segments within the polymer which have different microstructures. For example, the polymer can have repeat units at one end of its polymer chain which have a microstructure wherein there are predominantly 1,2-linkages with the repeat units at the other end of its polymer chain having a microstructure wherein there are predominantly 3,4-linkages. In such a rubbery copolymer of butadiene and isoprene the polymeric segment which is comprised predominantly of 1,2-linkages has a glass transition temperature which is between $-110°$ C. and $-20°$ C. The presence of such a polymeric segment which contains predominantly 1,2-linkages results in the rubbery polymer having a first glass transition temperature within the required range of $-110°$ C. to $-20°$ C. Such a copolymer of butadiene and isoprene can also contain a polymeric segment wherein there are predominantly 3,4-linkages. The presence of such a polymeric segment in butadiene-isoprene copolymers causes the polymer to have an additional glass transition temperature which is between $-20°$ C. and $20°$ C. This is normally observed as a third glass transition temperature in such rubbery copolymers. In the case of such copolymers the sequence of monomers within each segment is random, but the ratio of monomers within the different segments can be different. For instance, in copolymers of butadiene and isoprene the polymeric segment which is comprised predominantly of 1,2-linkages contains mostly chain linkages which are derived from butadiene. At the other end of the polymeric chains, the polymeric segments which are comprised predominantly of 3,4-linkages contain mostly repeat units which are derived from isoprene. In the area between these two distinct polymeric segments there can be a transition zone. Such a transition zone has a microstructure and a monomer content which is intermediate to the two polymeric segments at the opposite ends of the polymer. In effect the microstructure and monomeric make-up of the polymer in this transition zone is tapered.

In order to attain the multiple glass transition temperatures which are required in such polymers they are normally synthesized utilizing a technique wherein there are at least two distinct reaction zones. These reaction zones are maintained at different temperatures. By utilizing a two step polymerization technique which is carried out at two distinct temperatures the microstructure of the polymer being synthesized can be controlled. For instance, lower temperatures result in a higher content of 1,2-linkages. Accordingly, higher temperatures result in the formation of a greater amount of 3,4-linkages. The specific temperatures required in order to attain a desired microstructure and corresponding glass transition temperature depends upon the monomers being polymerized.

In the synthesis of rubbery copolymers of butadiene and isoprene which contain from about 10% to 50% isoprene and from about 50% to 90% butadiene, the temperature utilized in the first reaction zone is normally between about 120° F. (49° C.) and 190° F. (88° C.) with the temperature utilized in the second reaction zone being between about 190° F. (88° C.) and 210° F. (99° C.). The lower temperature in the first reaction zone results in a higher vinyl content and a correspondingly higher glass transition temperature. For example, utilizing a temperature of 120° F. (49° C.) and a residence time of 2 hours in the first reaction zone results in the formation of a copolymer having a first glass transition temperature of $-30°$ C., a second glass transition temperature of $-18°$ C., and a third glass transition temperature of $-10°$ C. The higher temperature which is maintained in the second reaction zone results in the production of a polymeric segment which has predominantly 3,4-linkages and a lower glass transition temperature.

A rubbery copolymer of butadiene and styrene having the desired multiple glass transition temperatures can be made in a process which utilizes two reactors. These styrene-butadiene rubbers normally contain from about 1 to about 40 mole percent styrene, based upon total monomers. In such a polymerization which utilizes from about 8 weight percent to about 12 weight percent styrene, the temperature in the first reactor is normally maintained within the range of about 120° F. (49° C.) to about 190° F. (88° C.). Normally, the residence time in the first reactor will be from about 0.5 to about 1 hour. This generally results in a conversion of about 30% to 80% with the polymeric segment formed having a vinyl content of about 80%, based upon butadiene repeat units. The polymeric segment formed in the first reactor generally contains about 8% repeat units which are derived from styrene. The temperature maintained in the second reactor will normally be from about 180° F. (82° C.) to 210° F. (99° C.). The residence time in the second reactor is normally from about 1 hour to about 2 hours. Such a residence time will normally result in a conversion of virtually 100%. The polymeric segment made in the second reactor at the higher polymerization temperature normally has a vinyl content of less than 40%.

Polar modifiers, such as ethers, chelating ethers, amines, or diamines of the open chain or cyclic type can be utilized in such polymerizations for preparing rubbery copolymers of butadiene and styrene. Some representative examples of some common modifiers that can be used include dipiperidinoethane, dipyrrolidinoethane, tetramethylethylene diamine, diethylene glycol dimethyl ether, tetrahydrofuran, and the like. Generally, from about 0.03 to about 0.12 phm (parts per hundred parts of monomer) of polar modifier is utilized. The mole ratio of the polar modifier to the organolithium initiator used will normally be in the range of 1:1 to 4:1. In most cases, a mole ratio of polar modifier to organolithium initiator of about 2:1 is preferred. The polar modifier can be added to the first reaction zone, to the second reaction zone, or to both the first and second reaction zones. The mode of modifier addition controls the polymers microstructure and its glass transition temperature. Such polar modifiers increase the content of 1,2-linkages present in the polymer being produced. Thus, in order to compensate for this higher vinyl content the amount of styrene incorporated into the polymer will normally be increased. It is necessary in order to maintain the required glass transition temperatures to increase the amount of styrene in the copolymer in order to compensate for the decrease in vinyl content. For example, if the copolymer has a vinyl content of about 50 to about 55% then about 5% styrene will need to be incorporated into it. On the other hand, if the copolymer has a vinyl content of about 20 to about 25% then about 30% styrene will need to be incorporated into the polymer.

It is normally advantageous to utilize the rubbery polymers of this invention in blends with other rubbers in making tire tread compounds. Tire treads of this type will normally be comprised of from 35 to 90 weight percent of a rubbery polymer of this invention having a first glass transition temperature within the range of $-110°$ C. to $-20°$ C. and a second glass transition temperature within the range of $-50°$ C. to $0°$ C., based upon the total amount of rubber in the tread. For instance, the rubbery copolymers of butadiene and isoprene of this invention can be blended with natural rubber in order to make tread compounds for passenger tires which exhibit outstanding rolling resistance, traction, and tread wear characteristics. Such blends will normally be comprised of from about 35 to 65 weight percent of the copolymer of butadiene and isoprene and from about 35 to 65 weight percent natural rubber. High performance tires which exhibit very exceptional traction characteristics, but somewhat compromised treadwear can be prepared by blending from about 60 to 80 weight percent of the copolymer of butadiene and isoprene with from about 20 to about 40 weight percent of a standard solution or emulsion styrene-butadiene rubber. In cases where wear is of greater importance than traction high cis-1,4-polybutadiene or high trans-1,4-polybutadiene can be substituted for the emulsion styrene butadiene rubber. Tire treads made utilizing such a rubber blend containing high cis-1,4-polybutadiene and/or high trans-1,4-polybutadiene exhibit very outstanding tread wear and rolling resistance with adequate traction characteristics.

It has been determined that truck tires having a good balance of properties can be prepared by utilizing from 20 to 40 weight percent of the isoprene-butadiene copolymer of this invention, from about 25 to 45 weight percent natural rubber, and from about 25 to about 45 weight percent solution styrene-butadiene rubber in a blend. Of course, a countless number of additional blends can be prepared which reap the benefits of the rubbery polymers of the present invention. For example, the styrene-butadiene rubbers of this invention can be used in tire treads in place of the isoprene-butadiene copolymers. Such a tire tread having improved traction, treadwear, and rolling resistance can be comprised of about 50 to about 80 parts by weight of the styrene-butadiene rubber, about 10 to about 40 parts by weight of polybutadiene, and about 10 to about 40 parts by weight of natural rubber.

This invention is illustrated by the following examples which are merely for the purpose of illustrating and are not to be regarded as limiting the scope of the invention or the manner in which it can be practiced. Unless specifically indicated otherwise, all parts and percentages are given by weight.

EXAMPLE 1

A copolymer containing 50% butadiene and 50% isoprene was prepared in a continuous system which was comprised of two polymerization reactors. This polymerization was catalyzed by charging 0.03 phm (parts per hundred parts of monomer) of n-butyl lithium into the first reactor. The first reactor had previously been charged with the monomers, solvent, and 0.06 phm of N,N,N',N'-tetramethylethylene diamine (TMEDA). The first reactor was maintained at a temperature of 185° F. (85° C.). The residence time in the first reactor was approximately 0.5 hours with a monomer conversion of about 60% being attained. The contents of the first reactor were continuously transferred to the second reactor which was maintained at a temperature within the range of 190° F. (88° C.) to 195° F. (91° C.). The residence time in the second reactor was 1 hour with a conversion of about 100% being attained.

The polymer produced was determined by infrared spectroscopy and nuclear magnetic resonancy spectroscopy to be a copolymer which contained 50% isoprene and 50% butadiene. It was determined by differential scanning calorimetry that the copolymer produced had three glass transition temperatures. These glass transition temperatures were determined to be at $-47°$ C., $-24°$ C., and $-10°$ C. The glass transition temperature which appeared at $-47°$ C. was the polymers first glass transition temperature which is associated with the absorption of polymeric segments which contain greater than 50% vinyl structure. The glass transition temperature which was observed at $-24°$ C. was the polymers second glass transition temperature which is associated with a polymeric segment which contains both high vinyl and 3,4-polyisoprene units and the glass transition temperature which appeared at $-10°$ C. was the polymers third glass transition temperature which associated with a polymeric segment which contains virtually pure 3,4-polyisoprene units.

The copolymer obtained was tested with three different instruments to study its multi-glass transitional nature. A DuPont Thermal Analyzer was used in the DSC mode. Runs were made at different heating rates and with different sample sizes. The best results were obtained by using a sample size of 8 mg and heating rate of 50° C. per minute. The DSC scan indicates the presence of three glass transition temperatures at $-30°$ C., $-12°$ C. and $0°$ C.

The same copolymer was also analyzed in an Auto Rheovibron. The Auto Rheovibron was run at 110 Hz. over a temperature range of −80° C. to 20° C. The raw rubber sample was used in the tensile mode at a heating rate of 1° C. per minute. The Auto Rheovibron also detected the three glass transition temperatures which were observed in the DSC analysis.

Similarly, the DuPont DTMA was used to analyze the same copolymer over a temperature span of −100° C. to 20° C. at a heating rate of 10° C. per minute. The DuPont DTMA was also used to analyze the rubber sample using a heating rate of 20° C. per minute over a temperature range of −50° C. to 60° C. The DTMA test results confirmed that the unique copolymer made had three glass transition temperatures and also confirmed its unique micro and macrostructure.

EXAMPLE 2

The procedure specified in Example 1 was repeated in this experiment except that the temperature utilized in the first reactor was 150° F. (66° C.). The copolymer made in this experiment had a first glass transition temperature of −47° C. which is a characteristic of polymeric segments which contain greater than 70% vinyl units. The copolymers second glass transition temperature was determined to be −18° C. The butadiene/isoprene copolymers third glass transition temperature was determined to be at −5° C.

EXAMPLE 3

The procedure specified in Example 1 was repeated in this experiment except that the temperature utilized in the first reactor was 170° F. (77° C.). The copolymer produced had a first glass transition temperature of −55° C., a second glass transition temperature of −24° C., and a third glass transition temperature of −8° C.

EXAMPLE 4

The procedure utilized in Example 1 was repeated in this experiment except that the monomer charge was comprised of 80% 1,3-butadiene and 20% isoprene. The butadiene/isoprene copolymer produced had a first glass transition temperature at −47° C., a second glass transition temperature at −24° C., and a third glass transition temperature at −10° C.

EXAMPLE 5

The procedure specified in Example 2 was repeated in this experiment except that the monomer charge was comprised of 80% butadiene and 20% isoprene. The copolymer produced had a first glass transition temperature at −44° C., a second glass transition temperature at −18° C., and a third glass transition temperature at −7° C.

EXAMPLE 6

A continuous two reactor system was used in the synthesis of polybutadiene. The monomer charge introduced into the first reactor was comprised of 100% butadiene. The organic solvent used was hexane and 0.03 phm of normal-butyl lithium was employed to initiate the polymerization. The residence time in the first reactor was 1 hour with a conversion of 40% being attained.

The contents of the first reactor were continuously transferred to the second reactor which was maintained at a temperature of 195° F. (91° C.). 0.06 phm of TMEDA was added to the second reactor. The polybutadiene made has a first glass transition temperature of −90° C., a second glass transition temperature of −18° C., and a third glass transition temperature of −24° C. The chain segments made in the first reactor had a microstructure which was comprised of over 90% 1,4-butadiene units (cis and trans). The majority of the chain segments made in the second reactor had a microstructure which was comprised of 1,2-units.

EXAMPLE 7

The procedure described in Example 1 was utilized to synthesize copolymers of butadiene and isoprene in which the ratio of butadiene to isoprene was 40/60. The copolymer obtained showed multi-glass transition peaks in the DSC which is indicative of a unique micro and macrostructural architecture. This unique architecture was introduced in the polymer by feed rate and catalyst manipulation.

EXAMPLE 8

The procedure specified in Example 6 was repeated in this experiment except that the ratio of modifier to lithium was changed so as to effect the rate of isoprene incorporation. The temperature in the first reactor was lowered to 150° F. (66° C.) and the temperature in the second reactor was raised to 190° F. (88° C.). The copolymer prepared showed multi-glass transition temperatures at −30° C., −18° C. and −44° C. The lower temperature in the first reactor increased the vinyl content in the polybutadiene portion of the copolymer and the higher temperature in the second reactor reduced the 3,4 content in the polyisoprene portion in the copolymer. The polybutadiene-polyisoprene copolymer produced was rich in polybutadiene at the beginning of its polymeric chain and rich in polyisoprene at the end of the chain with the interphase between the beginning and end of the chain containing substantial quantities of both 1,4-polyisoprene and 1,4-polybutadiene. The butadiene/isoprene ratio was manipulated from 60/40 to 20/80. This experiment shows that a series of copolymers can be made with unique structures and three transition temperatures at approximately −60° C., −30° C. and −8° C.

EXAMPLE 9

The procedure specified in Example 6 was repeated in this experiment except that isoprene monomer was substituted for the 1,3-butadiene monomer polymerized in Example 6. The polyisoprene produced was determined to have a first glass transition temperature at −65° C., a second glass transition temperature at −10° C., and a third glass transition temperature at −24° C.

EXAMPLE 10

The procedure specified in Example 6 was repeated in this experiment except that a monomer charge which consisted of 30% 1,3-butadiene and 70% isoprene was utilized. The polymer produced had a first glass transition temperature of −80° C., a second glass transition temperature of −24° C., and a third glass transition temperature of −10° C.

EXAMPLE 11

The procedure utilized in Example 10 was repeated in this experiment except that the monomer charge was comprised of 80% butadiene and 20% isoprene. The butadiene/isoprene copolymer produced had a first glass transition temperature of −80° C., a second glass transition temperature of −24° C., and a third glass transition temperature of −10° C.

EXAMPLE 12

The procedure specified in Example 10 was repeated in this experiment except that the monomer charge was comprised of 90% butadiene and 10% isoprene. The styrene-butadiene rubber produced had a first glass transition temperature at −90° C. and a second glass transition temperature at −21° C.

EXAMPLE 13

The procedure specified in Example 1 was repeated in this experiment with both the butadiene monomer and the isoprene monomer being charged into the first reactor. The reactor charge contained hexane as a solvent and n-butyl lithium as a catalyst. The polymerization in the first reactor was allowed to proceed at 175° F. (79° C.). The copolymer obtained in the first reactor had a structure which was predominately 1,4 and had a glass-transition temperature at −85° C. Additional hexane solvent and chelating modifier (N, N, N¹, N¹-tetramethylenediamine) were added to the second reactor along with the solvent and copolymer that were transferred from the first reactor and the polymerization allowed to continue at 190° F. (88° C.). The final product was a copolymer having a 50/50 butadiene/isoprene content and three glass transition temperatures at −85° C., −40° C. and −12° C.

EXAMPLE 14

The procedure specified in example 13 was repeated except that a monomer charge containing 70% 1,3-butadiene and 30% isoprene was utilized. The temperature in the first reactor was maintained at 175° F. (79° C.) and the conversion was limited to 50%. The copolymer of butadiene/isoprene made in the first reactor had a Tg at −85° C. and was pumped to the second reactor which was maintained at a polymerization temperature of 150° F. (66° C.). All the modifiers were added to the second reactor to produce a change in the microstructure and the monomer sequence distribution in the final product. After complete polymerization to a conversion of 100%, the final product had three glass transition temperatures at −85° C., −30° C. and −12° C.

EXAMPLE 15

A monomer charge containing 50% butadiene and 50% styrene in hexane was added to a five gallon (18.9 liter) reactor. Polymerization was initiated by adding n-butyl lithium with the polymerization temperature being maintained at 150° F. (66° C.). After 30% conversion was attained as determined by monomer gaschromtography analysis, a diluting diamine modifier was added to the polymerization. A copolymer sample obtained before modifier addition was determined to have a glass transition temperature at −90° C. After the polymerization was allowed to proceed to 100% conversion, the copolymer obtained showed three glass transition temperatures at −90° C., −40° C. and −18° C. Since the modifier addition to the polymerization is a slow, complexing step, it gives raise to the interphase glass transition temperature at −40° C. After the complete modifier complexation with live lithium ends gave raise to the high Tg of −18° C. This example demonstrates the versatility of the process of this invention for making unique copolymers of multi-glass temperatures.

EXAMPLE 16

The same procedure specified in Example 15 was followed in this experiment except that the addition of modifiers was delayed until 50% conversion was achieved. The copolymer obtained showed similar glass transition temperatures at −80° C., −47° C. and −12° C.

EXAMPLE 17

The same procedure as specified in Example 15 was followed in this experiment except that the addition of modifier was delayed until 70% conversion was achieved. The copolymer obtained had two distinct glass transition temperatures at −90° C. and −20° C. A weak glass transition temperature caused by the polymer interphase was observed at −50° C. The delayed addition of modifier in a batch process or the addition of modifier in the second reactor in a two reactor system has been utilized to produce unique polymers of multiglass transition temperatures and copolymers of unique sequence distribution of monomers in copolymerization and unique microstructural changes in homopolymerization. Examples 18 and 19 illustrate these points.

EXAMPLE 18

The procedure specified in example 1 was followed in this experiment except that all of the modifier was added in the second reactor. The copolymer obtained had two glass transition temperatures at −90° C. and −12° C. A weak glass transition temperature at −30° C. was also observed.

EXAMPLE 19

The procedure specified in Example 15 was utilized in this experiment except that all of the modifier was added at a conversion of 30%. The styrene-butadiene rubber produced had glass transition temperatures at −90° C. and −30° C. A weak glass transition temperature was also observed at −12° C.

EXAMPLE 20

Pneumatic tires of conventional construction (grooved tread, sidewalls, spaced beads, and supporting fabric-reinforced carcass) were built, shaped and cured in a conventional tire mold. The tread was built onto the uncured carcass as a pre-extruded element. The tires built were belted radial ply passenger tires.

The tread composition used in making these tires was comprised of 70 parts of the butadiene/isoprene copolymer made by the process specified in Example 1, 20 parts of high cis-1,4-polybutadiene, 10 parts of natural rubber, 45 parts of carbon black, 10 parts of processing oils, 3 parts of antioxidants, 1 part of wax, 3 parts of sulfur, 1 part of stearic acid, 1.25 parts of accelerators, and 1.25 parts of zinc oxide.

The tires made were mounted on rims, inflated and submitted for testing to determine their rolling resistance and treadwear. The rolling resistance and treadwear were determined as comparative values to the rolling resistance and treadwear of a control tire which were normalized to values of 100. The control tire was built utilizing 70 parts of styrene-butadiene rubber in place of the butadiene/isoprene copolymer. Traction was determined relative to an ASTM E501 control tire which was normalized to a value of 100. The rolling resistance was measured by turning the tires on a 67 inch (170 cm) dynamometer under 60%, 80%, and 100% of the tires rated loads at a rate equivalent to a vehicular speed of 50 miles per hour (80 kilometers per hour) with the drag force being measured. Traction was measured by using a standard test in which the test tire and control tire were mounted on opposite sides of a weighted trailer which was drawn over a wet surface wherein brakes could be applied with the skid force (peak and slide) being measured. Treadwear was measured using a standard Texas treadwear test. The test tires were determined to have a rolling resistance at 100% load of 112, a rolling resistance at 80% load of 114, and a rolling resistance at 60% load of 115. The test tires were also determined to have a wet traction rating at 20 miles per hour (32 kilometers per hour) of 106 and a wet traction rating at 60 miles per hour (97 kilometers per hour) of 133. The treadwear of the test tire was determined to be 137.

This example clearly shows that the butadiene/isoprene copolymers of this invention can be used in making tire treads which have outstanding characteristics. In fact, they can be used to improve the tires' traction, treadwear, and rolling resistance. It has traditionally been very difficult to improve a tire's rolling resistance without sacrificing its wet skid resistance. However, traction, treadwear, and rolling resistance can all be improved by utilizing the butadiene/isoprene copolymers of this invention in tire treads.

EXAMPLE 21

A pneumatic test tire was made and tested utilizing the procedure specified in Example 20 except that the styrene-butadiene rubbers made by the process specified in Example 15 was used in place of the butadiene/isoprene copolymer. The test tires made were determined to have a rolling resistance at 100% load of 119, a rolling resistance at 80% load of 120, and a rolling resistance at 60% load of 121. The test tires made were also determined to have a wet traction rating at 20 miles per hour (32 kilometers per hour) of 106 and a wet traction rating at 60 miles per hour (97 kilometers per hour) of 136. The treadwear of the test tire was determined to be 141.

This example clearly shows that the styrene-butadiene rubbers of this invention can be used in making tire treads which have an excellent combination of properties. In fact, the utilization of such styrene-butadiene rubbers in tire treads results in improved traction, treadwear, and wet skid resistance.

EXAMPLE 22

A terpolymer containing 45% butadiene, 45% isoprene, and 10% styrene was prepared in a continuous system which was comprised of two polymerization reactors. This polymerization was initiated by charging 0.03 phm of n-butyl lithium into the first reactor. The first reactor had previously been charged with the monomers, solvent, and 0.06 phm of N,N,N',N'-tetramethyl ethylene diamine.

The first reactor was maintained at a temperature of 185° F. (85° C.). The residence time in the first reactor was approximately 0.5 hours with a conversion of about 60% being attained. The contents of the first reactor were continuously transferred to the second reactor which was maintained at a temperature within the range of 190° F. (88° C.) to 195° F. (91° C.). The residence time in the second reactor was one hour with a conversion of about 100% being attained.

The terpolymer synthesized had a first glass transition temperature at −73° C. and a second glass transition temperature at −23° C. It was also determined that the terpolymer produced had a tan delta at 0° C. of 0.49 and a tan delta at 60° C. of 0.070.

EXAMPLE 23

The procedure specified in Example 22 was repeated in this experiment except that a terpolymer containing 40% butadiene, 40% isoprene, and 20% styrene was made. It was determined to have a glass transition temperature at −78° C. and a second glass transition temperature at −19° C. The terpolymer produced was also determined to have a tan delta at 0° C. of 0.64 and a tan delta at 60° C. of 0.091.

EXAMPLE 24

The procedure specified in Example 22 was repeated in this experiment except that a terpolymer containing 35% isoprene, 35% butadiene, and 30% styrene was synthesized. The terpolymer made was determined to have a tan delta at 0° C. of 0.098 and a tan delta at 60° C. of 0.134.

Variations in the present invention are possible in light of the description of it provided herein. It is, therefore, to be understood that changes can be made in the particular embodiments described which will be within the full intended scope of the invention as defined by the following appended claims.

What is claimed is:

1. A rubbery polymer which has an excellent combination of properties for use in making tire treads which is comprised of repeat units which are derived from at least one conjugated diolefin monomer, wherein the rubbery polymer has a first glass transition temperature which is between −110° C. and −65° C. and a second glass transition temperature which is between −35° C. and 0° C.

2. A rubbery polymer as specified in claim 1 wherein said polymer has an additional glass transition temperature which is between −20° C. and 20° C.

3. A rubbery polymer as specified in claim 1 herein the repeat units at one end of the polymer have microstructure wherein there are predominantly 1,4-linkages.

4. A rubbery polymer as specified in claim 1 wherein said rubbery polymer has a first glass transition temperature within the range of −100° C. to −65° C. and a second glass transition temperature within the range of −35° C. to −10° C.

5. A rubbery polymer as specified in claim 1 wherein said rubbery polymer has a first glass transition temperature within the range of −90° C. to −70° C. and a second glass transition temperature within the range of −20° C. to −10° C.

6. A rubbery polymer as specified in claim 2 wherein said rubbery polymer is a copolymer of butadiene and isoprene.

7. A rubbery polymer as specified in claim 6 wherein from 10 mole percent to 50 mole percent of the copolymers repeat units are derived from isoprene and wherein from 50 mole percent to 90 mole percent of the copolymers repeat units are derived from butadiene.

8. A rubbery polymer as specified in claim 7 wherein the repeat units at one end of the copolymer have a microstructure wherein there are predominantly 1,2-linkages and wherein the repeat units at the other end of the copolymer have a microstructure wherein there are predominantly 3,4-linkages.

9. A rubbery polymer as specified in claim 1 wherein said repeat units are derived from at least one conjugated diolefin monomer and at least one vinyl aromatic monomer.

10. A rubbery polymer as specified in claim 9 herein said vinyl aromatic monomer is styrene.

11. A rubbery polymer as specified in claim 10 herein said conjugated diolefin monomer is 1,3-butadiene.

12. A process for preparing a rubbery polymer which exhibits multiple glass transition temperatures and which has an excellent combination of properties for use in making tire treads, which comprises polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −50° C. and 0° C.; wherein said polymerization is initiated with an organolithium compound; and wherein the first reaction zone and second reaction zone are maintained at different temperatures.

13. The rubbery polymer made by the process specified in claim 12.

14. A process specified in claim 12 further comprising polymerizing at least one vinyl aromatic monomer with said conjugated diolefin monomers.

15. A process as specified in claim 14 wherein said conjugated diolefin monomer is 1,3-butadiene and wherein said vinyl aromatic monomer is styrene.

16. A process as specified in claim 15 wherein the temperature in said first reaction zone is from 49° C. to 88° C. and wherein the temperature in said second reaction zone is from 82° C. to 99° C.

17. A process as specified in claim 16 wherein from about 8 mole percent to 12 mole percent styrene is present, based upon total monomers.

18. A rubber blend which has an excellent combination of properties for use in making tire treads which is comprised of from about 35 to 65 weight percent of the rubbery polymer specified in claim 7 and from about 35 to 65 weight percent natural rubber.

19. A rubber blend which has an excellent combination of properties for use in making tire treads which is comprised of from about 60 to 80 weight percent of the rubbery polymer specified in claim 7 and from about 20 to 40 weight percent of a styrene-butadiene rubber.

20. A rubber blend as specified in claim 19 wherein said styrene-butadiene rubber was prepared in an emulsion polymerization.

21. A rubber blend which has an excellent combination of properties for use in making tire treads which is comprised of from about 60 to 80 weight percent of the rubbery polymer specified in claim 7 and from about 20 to 40 weight percent of at least one rubber selected from the group consisting of high cis-1,4-polybutadiene and high trans-1,4-polybutadiene.

22. A rubber blend which has an excellent combination of properties for use in making tire treads which is comprised of from 20 to 40 weight percent of the rubbery polymer specified in claim 7, from about 25 to 45 weight percent natural rubber, and from about 25 to 45 weight percent of a styrene-butadiene rubber.

23. A rubber blend as specified in claim 22 wherein said styrene-butadiene rubber was prepared in a solution polymerization.

24. A rubber blend which has an excellent combination of properties for use in making tire treads which is comprised of from about 50 to about 80 weight percent of the rubbery polymer specified in claim 9; from about 10 to about 40 weight percent of polybutadiene; and from about 10 to about 40 weight percent of natural rubber.

25. A rubber blend which has an excellent combination of properties for use in making tire treads which is comprised of from about 50 to about 80 weight percent of the rubbery polymer specified in claim 6; from about 10 to about 40 weight percent of polybutadiene; and from about 10 to about 40 weight percent of natural rubber.

26. A pneumatic tire which is comprised of a tread, sidewalls, and a supporting carcass wherein the tread is comprised of the rubber blend specified in claim 24.

27. A pneumatic tire which is comprised of a tread, sidewalls, and a supporting carcass wherein the tread is comprised of the rubber blend specified in claim 25.

* * * * *

UNITED STATES PATENT AND TRADEMARK OFFICE
CERTIFICATE OF CORRECTION

PATENT NO. : 4,843,120

DATED : June 27, 1989

INVENTOR(S) : Halasa et al

It is certified that error appears in the above-identified patent and that said Letters Patent is hereby corrected as shown below:

At column 2, lines 42-45, the structural formula should read as follows:

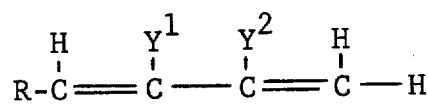

Signed and Sealed this

Twentieth Day of October, 1992

Attest:

DOUGLAS B. COMER

*Attesting Officer*       *Acting Commissioner of Patents and Trademarks*